(12) United States Patent
Lee

(10) Patent No.: US 7,481,342 B2
(45) Date of Patent: Jan. 27, 2009

(54) SPARE TIRE CARRIER FIXING HOLDER

(75) Inventor: Dong-Ho Lee, Busan Metropolitan (KR)

(73) Assignee: Hyundai Motor Company, Seoul (KR)

( * ) Notice: Subject to any disclaimer, the term of this patent is extended or adjusted under 35 U.S.C. 154(b) by 614 days.

(21) Appl. No.: 11/117,208

(22) Filed: Apr. 28, 2005

(65) Prior Publication Data
US 2005/0284900 A1    Dec. 29, 2005

(30) Foreign Application Priority Data
Jun. 23, 2004    (KR)    .................... 10-2004-0047112

(51) Int. Cl.
*B62D 43/00*    (2006.01)
(52) U.S. Cl. .................. 224/42.23; 224/42.12; 296/37.2
(58) Field of Classification Search ............. 224/42.21, 224/42.12, 42.13, 42.2, 42.23, 42.24; 414/466, 414/463; 296/37.2, 37.3
See application file for complete search history.

(56) References Cited

U.S. PATENT DOCUMENTS

| | | | | |
|---|---|---|---|---|
| 1,672,356 A | * | 6/1928 | Wasserfallen | ............... 414/466 |
| 2,956,716 A | * | 10/1960 | Goulet | .................... 224/42.21 |
| 4,015,761 A | * | 4/1977 | Kokko | ..................... 224/42.24 |
| 4,068,856 A | * | 1/1978 | Harris | ........................ 411/400 |
| 4,093,088 A | * | 6/1978 | Hildebrandt et al. | ........ 414/463 |
| 4,130,227 A | * | 12/1978 | Rice | ........................ 224/42.24 |
| 4,238,091 A | * | 12/1980 | Clain et al. | ............... 224/42.23 |
| 4,308,733 A | * | 1/1982 | Tampa | ........................ 70/259 |
| 4,964,552 A | * | 10/1990 | Terwilliger | ............... 224/42.23 |
| 5,027,991 A | * | 7/1991 | Braddock | ................. 224/42.23 |
| 5,076,629 A | * | 12/1991 | Peters et al. | ................ 296/37.2 |
| 5,487,288 A | * | 1/1996 | Frantz | ........................ 70/259 |

FOREIGN PATENT DOCUMENTS

| | | | |
|---|---|---|---|
| DE | 4243815 A1 | * | 6/1994 |
| EP | 431738 A1 | * | 6/1991 |
| GB | 2108565 A | | 5/1983 |
| JP | 7180708 | | 7/1995 |

* cited by examiner

*Primary Examiner*—Nathan J Newhouse
*Assistant Examiner*—Corey N Skurdal
(74) *Attorney, Agent, or Firm*—Morgan, Lewis & Bockius LLP

(57) ABSTRACT

A spare tire carrier fixing holder includes a bolt penetrating a vehicle body member. A holder is equipped at the upper end with a nut screwed to the bolt while the lower end of the holder is formed with a hook onto which a carrier is engaged. A guide ring is formed within the holder to guide the bolt to minimize the eccentricity between the bolt and nut.

11 Claims, 4 Drawing Sheets

SPARE TIRE CARRIER FIXING HOLDER

CROSS-REFERENCE TO RELATED APPLICATIONS

The present application is based on, and claims priority from, Korean Application Serial Number 10-2004-0047112, filed on Jun. 23, 2004, the disclosure of which is hereby incorporated by reference herein in its entirety.

FIELD OF THE INVENTION

The present invention relates to a spare tire carrier fixing holder. More particularly, the present invention relates to a fixing holder that fixes a carrier by which a spare tire is installed onto the vehicle body.

BACKGROUND OF THE INVENTION

Generally, a spare tire is carried in a vehicle for replacing a flat tire. The spare tire is installed at a carrier fixed to the vehicle body via a fixing holder. The spare tire carrier is often tough to use in that it is typically fastened to the vehicle body by a holder via a nut and bolt which are difficult to properly align with each other. (The misalignment of a bolt and nut such that the nut cannot screw onto the bolt is called "eccentricity.") Also, the bolt often suffers from corrosion due to its exposure to the exterior of the vehicle. Further, the typical spare tire carrier falls from the vehicle body when the bolt is removed, sometimes causes bodily injury to the user.

SUMMARY OF THE INVENTION

The present invention discloses a spare tire carrier fixing holder that includes a bolt penetrating a vehicle body member, a holder that is equipped at the upper end with a nut screwed to the bolt and a lower end formed with a hook onto which a carrier is held, and a guide ring that is formed in the holder to guide the bolt.

In one embodiment, the holder is mounted with a cover that prevents exposure of the bolt to the exterior, thus preventing corrosion. In another embodiment, a protrusion extends from the nut and is positioned to be held by the vehicle body member, thus preventing the holder from falling from the vehicle body member when the bolt is detached. In yet another embodiment, the upper surface of the guide ring is inclined to allow the bolt to easily be inserted into the guide ring. This minimizes the eccentricity between the bolt and the nut by allowing the bolt to be guided into the holder. In a further embodiment, the bolt has a threaded section formed at its upper portion to be disposed in the vehicle body member, and an unthreaded section formed at its lower portion to be disposed outside the vehicle body member.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
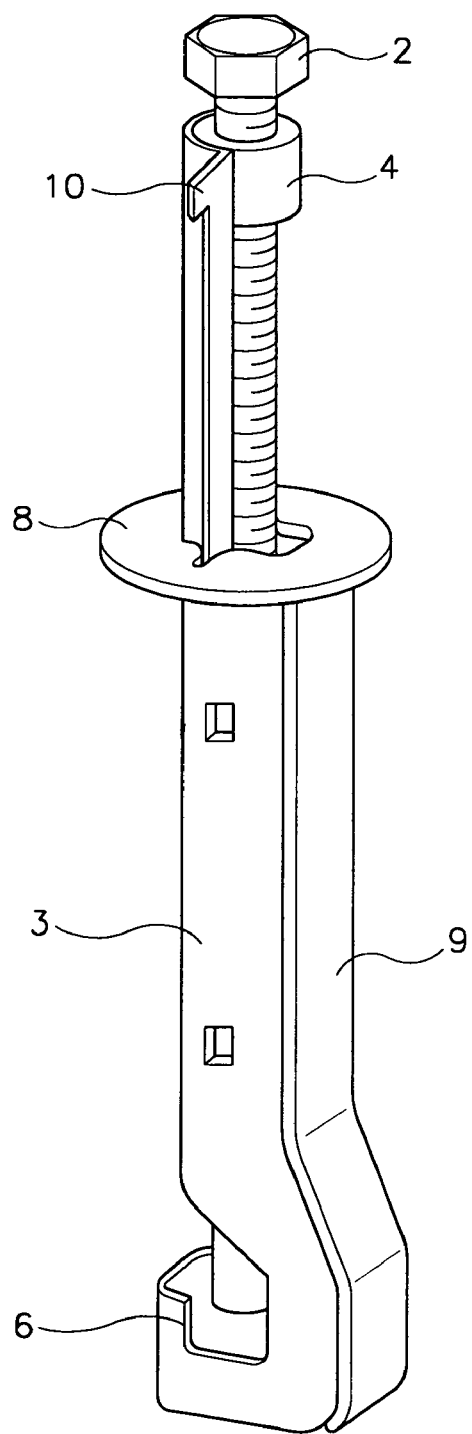
FIG. 1 is a perspective view of a spare tire carrier fixing holder according to an embodiment of the present invention.

Referring to FIG. 1, the present invention is a spare tire carrier fixing holder that includes bolt 2 penetrating vehicle body member 1. Bolt 2 is screwed with nut 4 placed at an upper end of holder 3. Holder 3 is formed at the lower end with hook 6 onto which carrier 5 is held. A guide ring 7 is formed in holder 3 to guide bolt 2.

Figure 2:
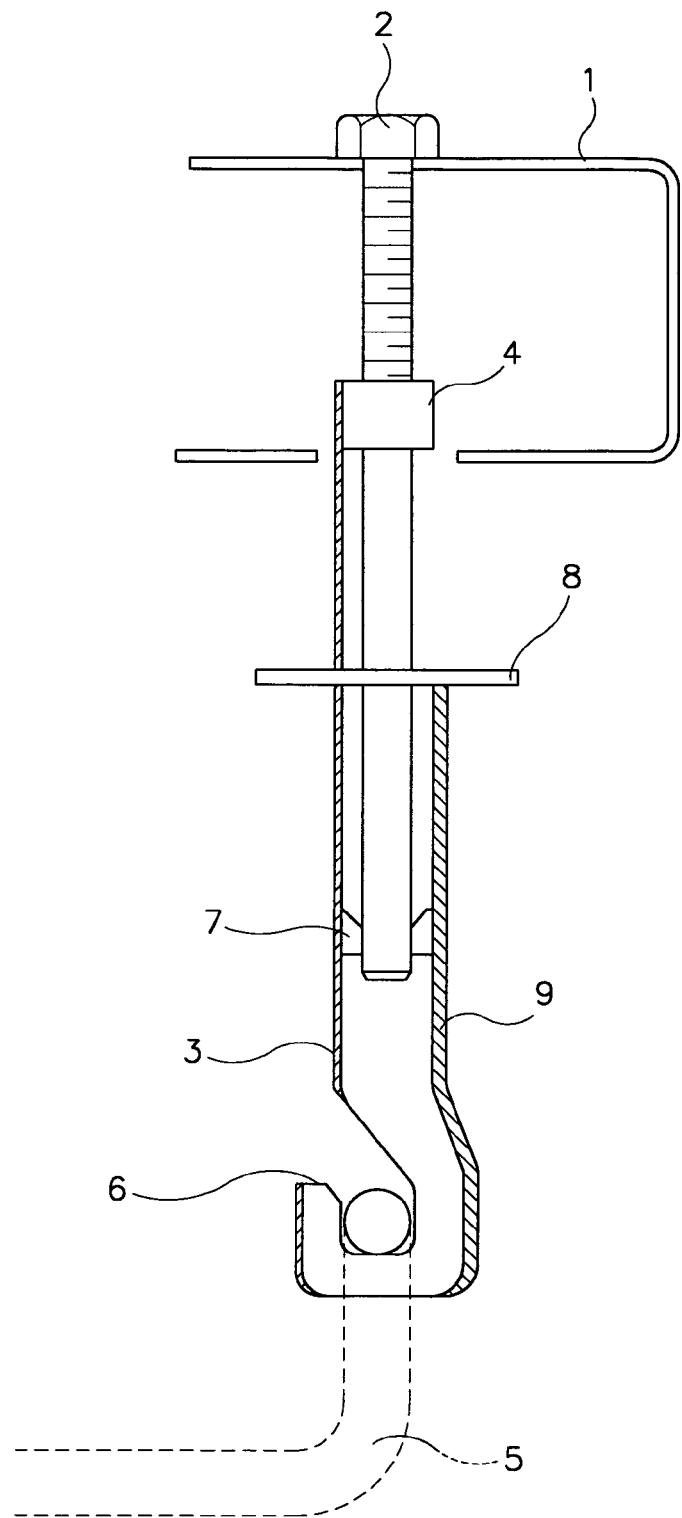
FIG. 2 is a vertical cross-sectional view of a spare tire carrier fixing holder according to another embodiment of the present invention.

In another embodiment, the section of the bolt that is located outside of the vehicle body is protected by a cover to prevent the bolt from corroding. Referring to FIG. 2, the upper section of bolt 2 is located in vehicle body member 1, and lower section of bolt 2, which is outside of vehicle body 1, is located within exposure preventing cover 9. Thus, the entire bolt is prevented from being corroded.

In yet another embodiment, the holder includes a circular plate located around the bolt so that the plate attaches to the vehicle body and seals the opening of the vehicle body where the bolt protrudes, thus preventing exposure of the bolt to the exterior. In FIG. 2, holder 3 is equipped with circular plate 8. Thus, when holder 3 is raised with nut 4 being fastened to bolt 2, circular plate 8 closely attaches to vehicle body member 1. Holder 3 is also mounted with exposure preventing cover 9 to prevent exposure of the portion of bolt 2 that protrudes from vehicle body 1.

In a further embodiment, a protrusion is disposed along the outside of the nut and is positioned to prevent the holder from falling away from the vehicle body when the bolt is removed. Referring back to FIG. 1 and referring now to FIG. 3, protrusion 10 is formed on holder 3 and is disposed at both sides of nut 4 and is held by vehicle body member 1 to prevent holder 3 from falling from vehicle body member 1 when removing bolt 2.

In yet a further embodiment, the guide ring within the holder is formed with an inclined upper surface to guide the bolt in the holder. As can be seen in FIG. 2, guide ring 7 is formed in holder 3 to guide the lower portion of bolt 2, and the inclined upper surface of guide ring 7 allows bolt 2 to be easily inserted into guide ring 7.

Figure 3:
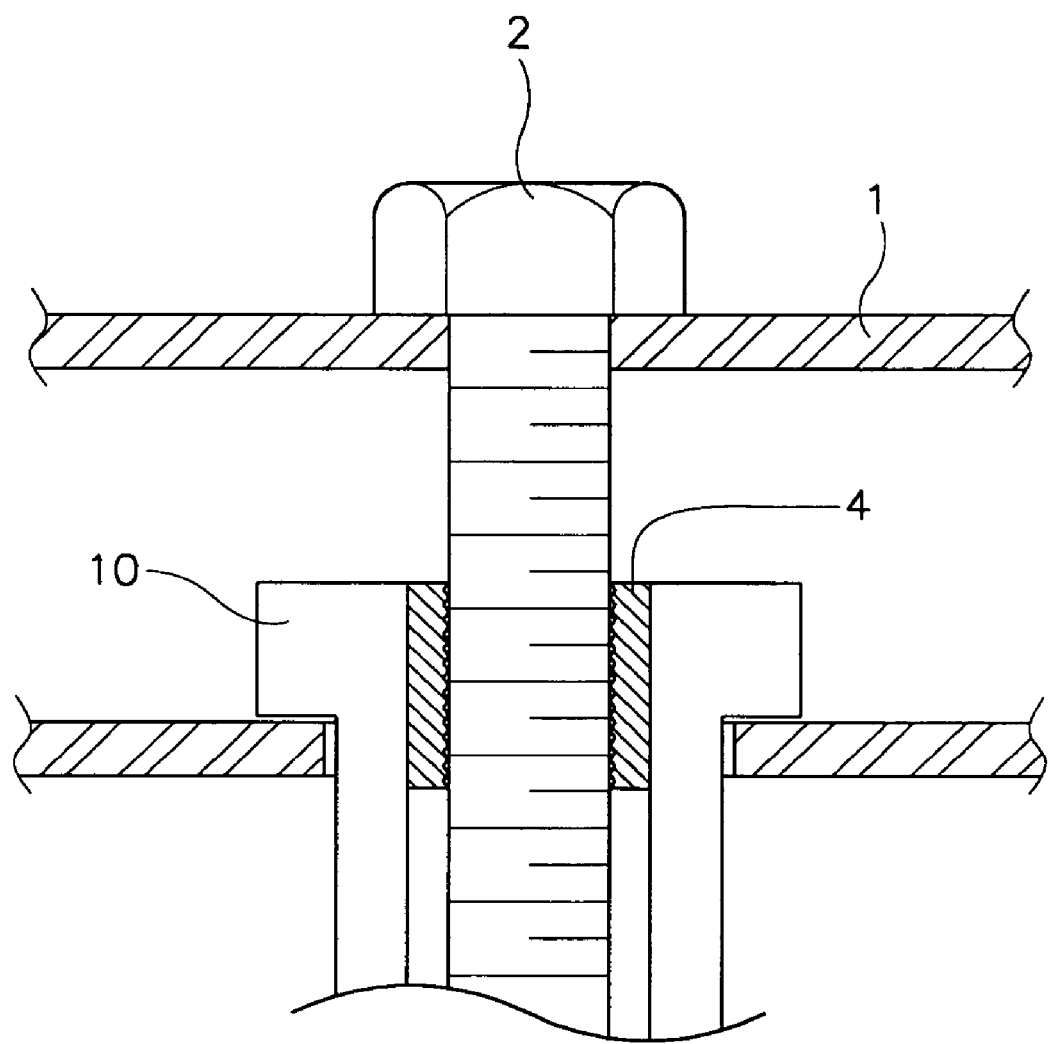
FIG. 3 is a principle cross-section of a spare tire carrier fixing holder according to another yet embodiment of the present invention.

In yet a further embodiment, the bolt has threads on the portion that is within the vehicle body and no threads on the portion outside the vehicle body. As can be seen in FIGS. 1-3, the upper portion of bolt 2 is threaded, while the lower portion of bolt 2 is not. With this configuration, nut 4 slips over the unthreaded portion and need only be screwed along the upper portion of bolt 2. This decreases the amount of time required to screw in bolt 2 to attach the spare tire carrier.

The operation and effect of the spare tire carrier fixing holder will now be described in detail.

Figure 4:
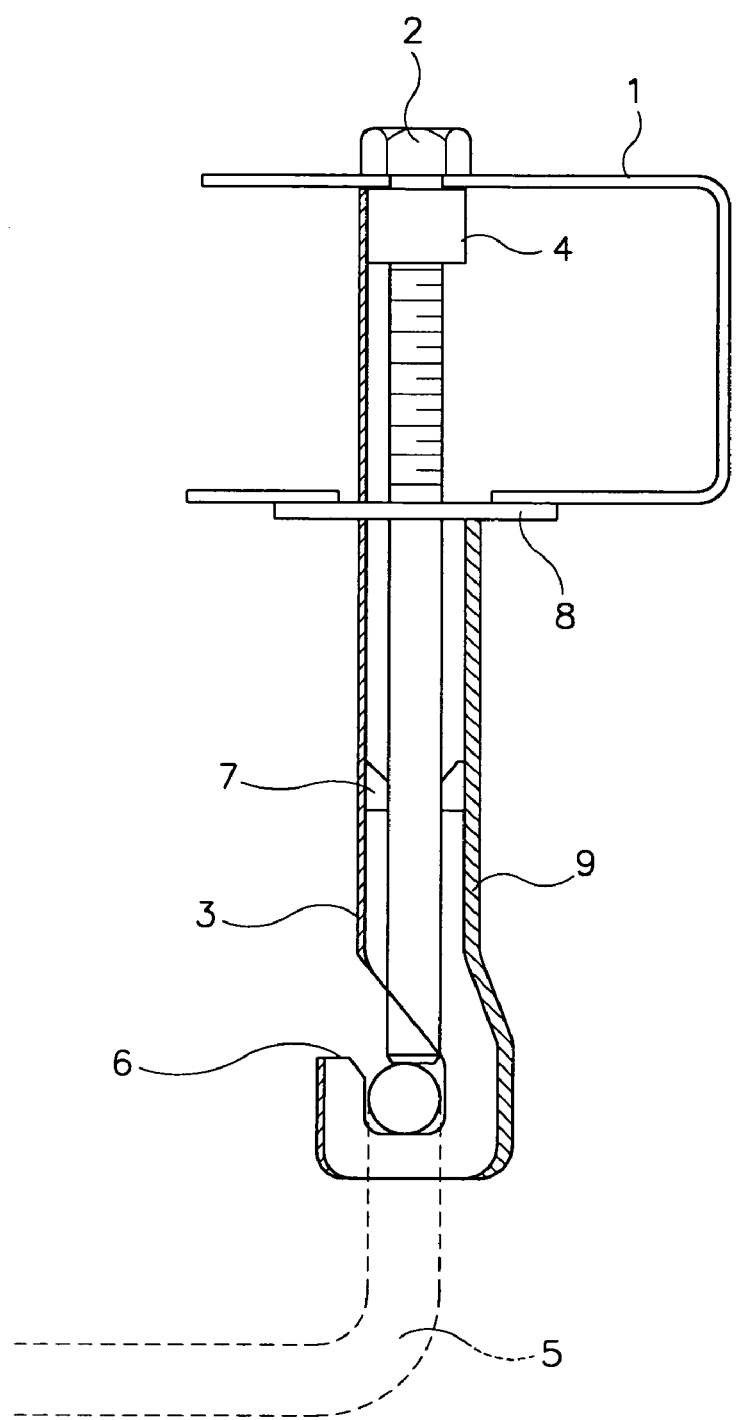
FIG. 4 illustrates a completely coupled state of a spare tire carrier fixing holder according to a further embodiment of the present invention.

In reference to FIG. 2, as bolt 2 turns and nut 4 screws onto bolt 2, holder 3, with carrier 5 engaged in hook 6, gradually moves toward vehicle body 1. As the unthreaded lower portion of bolt 2 is guided by guide ring 7 in holder 3, bolt 2 and holder 3 are supported by two points (i.e., nut 4 and guide ring 7), thereby minimizing the eccentricity between bolt 2 and holder 3. Bolt 2 is turned until circular plate 8 of holder 3 presses against vehicle body member 1. In this manner, carrier 5, installed with a spare tire, is stably fixed to the vehicle body in a completely coupled state of bolt 2 (see FIG. 4).

When unfastening bolt 2 from nut 4 to use the spare tire, even if bolt 2 is completely separated from nut 4, protrusion 10 formed at both sides of nut 4 are held by vehicle body member 1 as illustrated in FIG. 3, thus eliminating potential injury to the user due to the unintended release of the spare tire and carrier 5.

As apparent from the foregoing, there is an advantage in the present invention in that the eccentricity is minimized between a bolt and nut by allowing the bolt to be guided in a holder. Another advantage is prevention of corrosion of the bolt by precluding exposure of the bolt to the exterior. Yet another advantage is the movement distance of the holder is minimized by disposing the threaded section of the bolt in a vehicle body member and allowing the holder to vertically move along the threaded section, while disposing the unthreaded section of the bolt in the lower section. Since the carrier movies only along the threaded section, the carrier's movement is lessened. Therefore, attachment and detachment of the carrier are smoothly performed. A further advantage is that even if the bolt is removed from the nut during carrier detachment, the holder is held by the vehicle body member by protrusions, thus preventing injury to the user due to the release of the carrier and tire.

Although preferred embodiments of the present invention have been described in detail hereinabove, it should be clearly understood that many variations and/or modifications of the basic inventive concepts herein taught, which may appear to those skilled in the present art, will still fall within the spirit and scope of the present invention, as defined in the appended claims.

What is claimed is:

1. A spare tire carrier fixing holder, comprising:
   a bolt configured for penetrating a vehicle body member;
   a holder whose upper portion is formed with a nut screwed to an upper portion of the bolt while a distal end of the holder is formed with a hook onto which a carrier is held; and
   a guide ring formed in a lower portion of the holder to guide an unthreaded lower portion of the bolt, in which the unthreaded lower portion of the bolt is configured to slidably pass through the upper portion of the holder, wherein the holder comprises:
   an exposure preventing cover enclosing a portion of the unthreaded lower portion of the bolt and the holder and a circular plate formed on an upper portion of the exposure preventing cover and around a circumference of the bolt to prevent the bolt from being exposed to the exterior, the circular plate configured to closely attach to the vehicle body member as the nut is screwed to the bolt.

2. The holder as defined in claim 1, wherein the holder further includes a protrusion that is disposed at both sides of the nut and is held by the vehicle body member to thereby prevent the holder from falling from the vehicle body member during a detachment of the bolt.

3. The holder as defined in claim 1, wherein an upper surface of the guide ring is inclined to allow the bolt to easily be inserted into the guide ring.

4. The holder as defined in claim 1, wherein the threaded portion of the bolt is disposed in the vehicle body member, and the unthreaded lower portion of the bolt is formed at a lower portion of the bolt to be disposed outside the vehicle body member.

5. A spare tire carrier fixing holder, comprising:
   a bolt configured for penetrating a vehicle body member wherein a threaded portion is formed at an upper portion of the bolt to be disposed in the vehicle body member, and an unthreaded portion is formed at a lower portion of the bolt to be disposed outside the vehicle body member;
   a holder having an upper portion engaged with the threaded portion of the bolt and a hook formed at a lower distal end thereof for supporting a carrier portion; wherein the holder further includes a circular plate around the circumference of the bolt, the plate configured to closely attach to the vehicle body member as the nut is screwed to the bolt; and
   a guide element disposed in a lower portion of the holder and receiving the unthreaded portion of the bolt therethrough in sliding contact.

6. The holder as defined in claim 5, wherein the upper portion of the holder is formed with a nut screwed to the bolt.

7. The holder as defined in claim 5, wherein the holder is mounted with an exposure preventing cover to prevent the bolt from being exposed to the exterior.

8. A spare tire carrier fixing holder, comprising:
   a bolt configured for penetrating a vehicle body member wherein a threaded portion is formed at an upper portion of the bolt to be disposed in the vehicle body member, and an unthreaded portion is formed at a lower portion of the bolt to be disposed outside the vehicle body member;
   a holder having an upper portion engaged with the threaded portion of the bolt, a lower portion spaced longitudinally and below the upper portion of the holder, and a distal end formed below the lower portion of the holder with a hook onto which a carrier is held; wherein the holder further includes a circular plate around the circumference of the bolt, the plate configured to closely attach to the vehicle body member as the nut is screwed to the bolt; and
   a guide element disposed in said holder lower portion receiving the unthreaded bolt portion in sliding contact.

9. The holder as defined in claim 8, wherein a longitudinal length of the holder is substantially equal to or larger than a total length of the upper and lower portions of the bolt and a length of the lower portion of the holder is substantially equal to or larger than a length of the unthreaded portion of the bolt.

10. The holder as defined in claim 8, wherein the upper portion of the holder is formed with a nut screwed to the bolt.

11. The holder as defined in claim 8, wherein the holder is mounted with an exposure preventing cover to prevent the bolt from being exposed to the exterior.

* * * * *